United States Patent [19]
Hedlund et al.

[11] 4,388,657
[45] Jun. 14, 1983

[54] SEARCH-MODE ARRANGEMENT FOR VTR

[75] Inventors: Lee V. Hedlund, Maple Shade; Donald G. Herzog, Collingswood; Franz L. Putzrath, Haddonfield, all of N.J.

[73] Assignee: RCA Corporation, New York, N.Y.

[21] Appl. No.: 210,154

[22] Filed: Nov. 25, 1980

[51] Int. Cl.³ .............................................. G11B 15/14
[52] U.S. Cl. .................................. 360/72.1; 360/11.1; 360/64; 360/84
[58] Field of Search ................. 360/72.1, 73, 70, 74.1, 360/75, 78, 84, 130.23, 10–11, 64, 21, 33

[56] References Cited

U.S. PATENT DOCUMENTS

| | | |
|---|---|---|
| 3,925,816 | 12/1975 | Kihara .................................... 360/19 |
| 4,189,758 | 2/1980 | Morio et al. ........................... 360/77 |
| 4,307,417 | 12/1981 | Tokuyama ......................... 360/33 X |
| 4,318,143 | 3/1982 | Kubota et al. ................... 360/10 X |

FOREIGN PATENT DOCUMENTS 7801929  8/1978  Netherlands ........................... 360/21

Primary Examiner—John H. Wolff
Attorney, Agent, or Firm—E. M. Whitacre; W. H. Meise; H. I. Steckler

[57] ABSTRACT

In a VTR of the type having information recorded in adjacent tracks disposed angularly across the direction of tape travel, a search mode playback arrangement is incorporated having a pair of transducer gaps which are alternately enabled to continuously pickup coherent information while the playback arrangement scans across adjacent tracks during a search mode.

5 Claims, 6 Drawing Figures

Fig. 4.
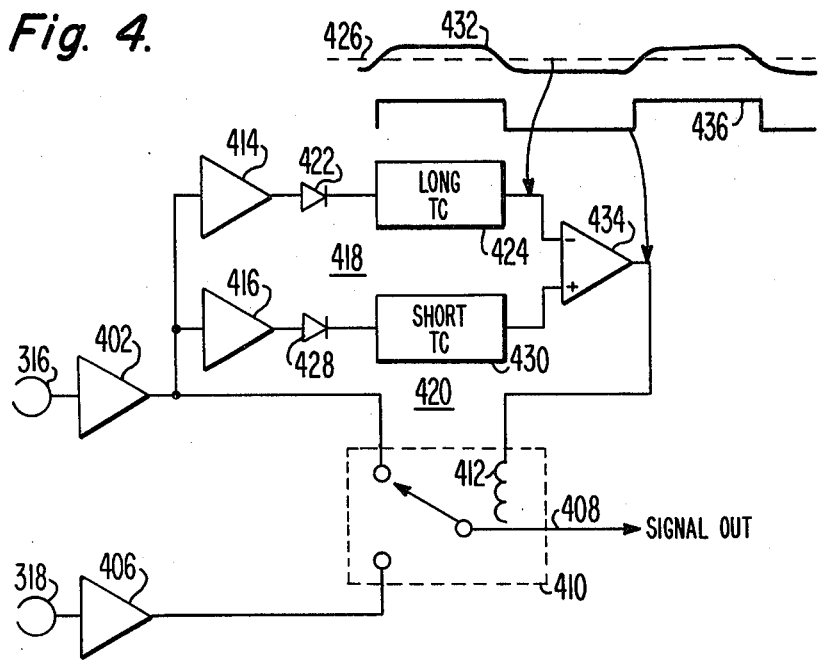
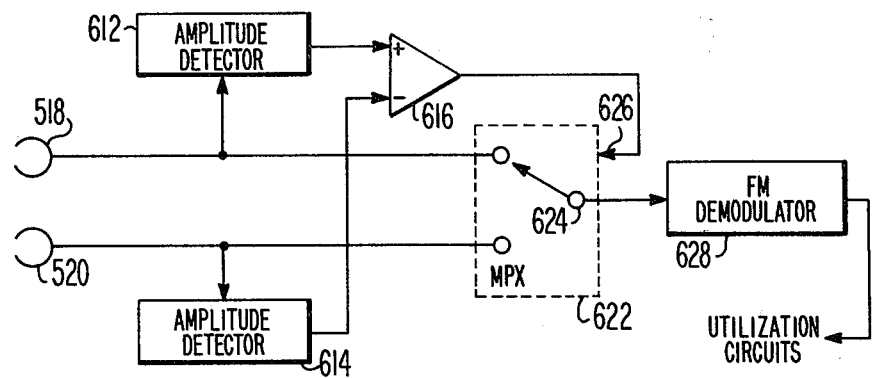
Fig. 6.

SEARCH-MODE ARRANGEMENT FOR VTR

BACKGROUND OF THE INVENTION

In helical-scan VTR's, the recording head produces tracks on the tape which are contiguous, i.e., in which the tracks are immediately adjacent each other or in which there is an intervening gap. An intervening gap, termed a guardband, is used for providing isolation between tracks on playback. When the tracks are abutting with no guardband, isolation between tracks on playback may be provided by what is termed azimuth recording. In azimuth recording, the gap of a recording head is oriented at an angle relative to the direction of head scan movement. This angle is different from the angle of the gap by which the adjacent track is recorded. Thus, the recorded track itself may be said to have an azimuth angle.

Normally, the playback head scans along or follows the same path taken by the recording head. Consequently, so long as the tape speed remains constant as between recording and playback, the playback head can be made to scan the recorded track. If the tape speed on playback deviates from the recording speed, the playback head may not follow the recorded track.

When relatively small differences in tape speed are involved, automatic scan tracking (AST) may be used to keep the playback head on the recorded track. During search modes of operation (moviola modes), however, AST cannot be relied upon to maintain tracking. Consequently, the playback head will leave the track to which it is responsive and partially overlie the region adjacent thereto which may be either another recorded track or a guardband. If it is another recorded track, it may be recorded at an azimuth angle to which the playback head is not responsive, in which case the adjacent recorded track is a guardband as to that head and the track to which the head is responsive. The adjacent region may also be another track recorded at the azimuth angle to which the playback head responds. During that time in which the gap of the playback head partially overlies the recorded track to which it is responsive and the adjacent region, the signal produced by the head from the track to which it is responsive is reduced in amplitude. Any signal transduced to the head by that portion of the adjacent region which a part of the transducer gap in the head overlies, will add or sum with that reduced signal from the recorded track. Since these signals are not coherent (i.e., they are not in a known phase relationship) they add to form random signal levels which constitute noise. Consequently, when a playback head only partially overlies its track, the signal becomes weak and may also become noisy because of extraneous signals from the adjacent regions. Thus, the search mode signals are liable to be weak and noisy.

The prior art copes with such search mode problems differently depending on whether analog or digital recorders are utilized. For analog recorders, the recording head is used during the search mode and the noise bar which results therefrom is merely tolerated. For digital recorders, a frame store is used to accumulate addressed picture portions from each track crossed during a single head sweep. Use of a transducer gap having a width substantially equal to the pitch spacing of the tracks to be scanned has been proposed for providing continuous pickup of coherent information from adjacent tracks during a search mode. However, problems arise with this proposal when the gap reaches a mid-point between tracks where signals may be picked up from both tracks or no signal may be picked up from either track depending on whether the gap width is large or small within the allowable tolerance.

SUMMARY OF THE INVENTION

A search mode playback arrangement for a video tape recorder includes a pair of transducer gaps which are alternately enabled to continuously pickup coherent information while the playback arrangement scans across adjacent tracks.

DESCRIPTION OF THE DRAWINGS

FIGS. 4 and 6 are block diagrams of typical control means for alternately enabling the transducer gaps in the playback arrangements of FIGS. 3 and 5 respectively.

DESCRIPTION OF THE PREFERRED EMBODIMENTS

Figure 1:
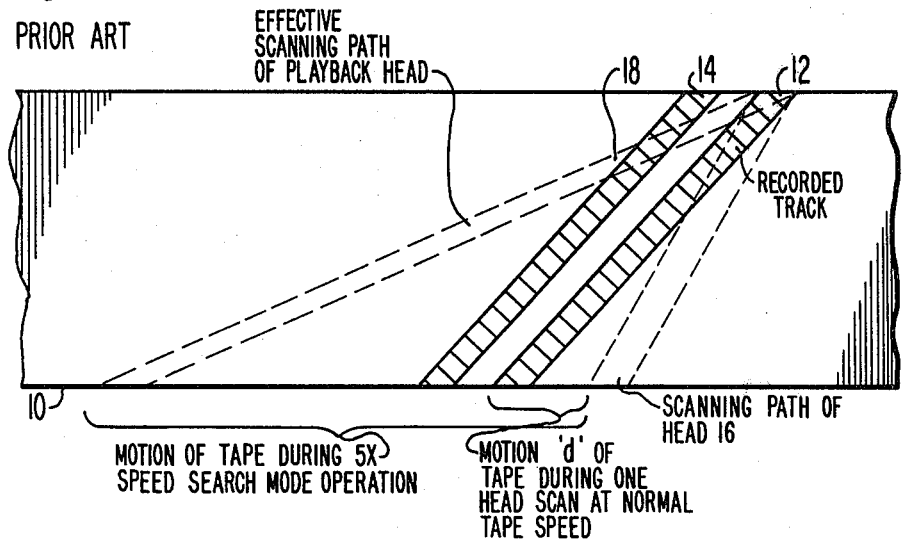
FIGS. 1 and 2 illustrate the scanning paths taken by the transducer gap of a prior art playback arrangement during a search mode.

FIG. 1 illustrates the tape 10 on which recorded tracks 12 and 14 are representative of other recorded tracks which are not shown. A path 16 is shown which represents the scan or travel of the transducer gap in a conventional search mode playback head when the tape is motionless. During either recording or replay, the tape is moving and therefore the tape travels through a distance (d) during one head scan at normal record or replay tape speed as shown in FIG. 1. Consequently, at normal tape speed the track 12 is brought into congruence with the path scanned by the head. During operation in the moviola or search mode, such as at 5 times normal tape speed, the transducer gap in the head scans an effective path 18 while the tape moves through a distance equal to 5d. Therefore, the transducer gap when following scanning path 18 passes from track 12 to track 14 and sequentially across portions of other recorded tracks.

Figure 2:
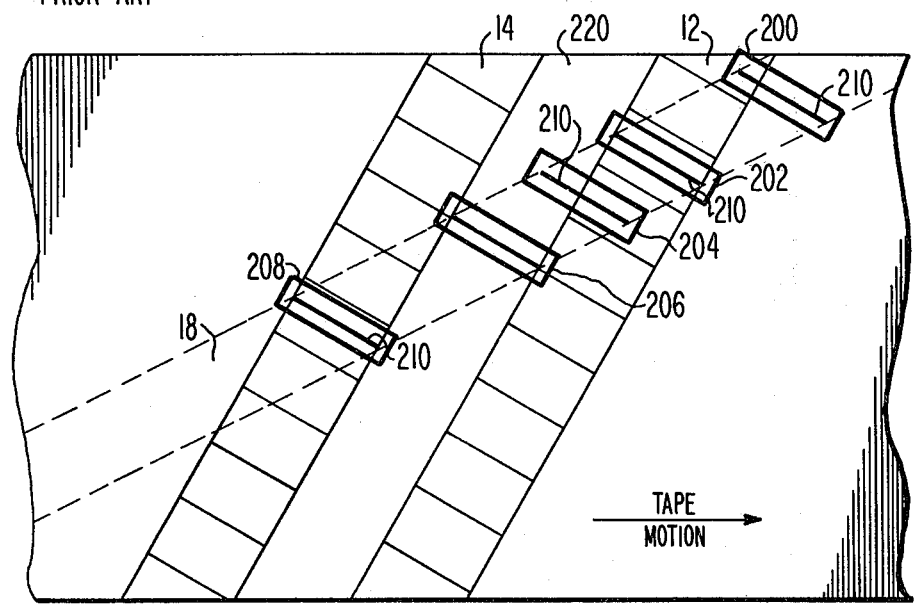

In FIG. 2, an expanded portion of the tape from FIG. 1 is shown with the search mode playback head being shown at various locations along the effective scanning path 18 such as at positions 200, 202, 204, 206 and 208. At position 200, the motion of the tape starts to bring track 12 into registry with the scan path 18 of the head's transducer gap 210 which has a width substantially equal to the width of the track 12. At location 202 the gap 210 is fully registered with the track 12 and picks up a maximum signal from track 12. At a later time, the motion of the tape causes the gap 210 to arrive at position 204 at which the gap 210 partially overlies the track 12 and partially overlies a guardband space 220. At position 204, the signal level picked up by the gap 210 from track 12 is reduced from its maximum value that was picked up in position 202. In position 206, the gap 210 is fully registered with the guardband 220 and may either pick up signals from both tracks 12 and 14 or no signal from either tracks 12 and 14 depending on whether its width is either large or small within dimensional tolerance. Therefore, as mentioned previously, any signal picked up by the gap 210 at location 206 is not coherent because it is weak and noisy. At position 208, gap 210 picks up maximum signal from track 14.

The search mode playback arrangement of the invention overcomes the problem of weak and noisy signal pickup discussed above. In this arrangement, a pair of transducer gaps are alternately enabled to continuously pickup coherent information while the arrangement scans across adjacent tracks during search modes. Each transducer gap is selectively dimensioned and arranged relative to the other gap in accordance with the tape format and the criteria used to alternately enable the gaps. Consequently, many embodiments of the invention are possible, such as the individual embodiments shown in FIGS. 3 and 5.

Figure 3:
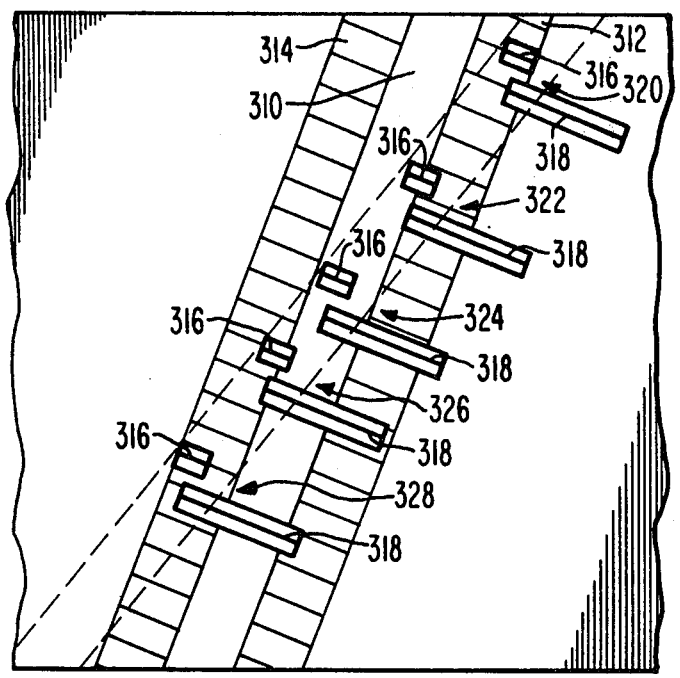
FIGS. 3 and 5 illustrate the scanning paths travelled by the gaps in typical search mode playback arrangements of the invention.

The tape format shown in FIG. 3 includes guardbands 310 separating the tracks such as 312 and 314 that are to be scanned in sequence by the playback arrangement. The search mode playback arrangement in FIG. 3 includes a first transducer gap 316 that is more narrow than the width of the tracks to be scanned by the playback arrangement and a second transducer gap 318 having a width substantially equal to the distance between adjacent tracks to be scanned plus the width of one such track. The scan of the second transducer gap 318 overlaps the scan of the first transducer gap 316 to assure that as a track is scanned by the playback arrangement, transducer gap 318 enters sufficiently thereupon to effectively pickup signals before transducer gap 316 departs sufficiently therefrom to become ineffective for picking up signals. Furthermore, the first transducer gap 316 is enabled to pickup information whenever it is effectively aligned over a track to be scanned by the playback arrangement and the second transducer gap 318 is enabled whenever the first gap 316 is not effectively aligned over a track to be scanned by the playback arrangement.

As the transducer gaps 316 and 318 are scanned across portions of the tracks during a search mode, they reside in several different positions relative to the tracks as shown in FIG. 3 at locations 320, 322, 324, 326 and 328. At location 320, transducer gap 316 is aligned within the track 312 while only a portion of transducer gap 318 is aligned within the track 312. Therefore, transducer gap 316 has become effectively aligned and enabled to pickup information at this location of the playback arrangement, while transducer gap 318 is disabled at this location. At location 322, transducer gap 316 becomes ineffective as it is about to depart from track 312 because the signal level picked up thereby is relatively low. However, transducer gap 318 is substantially aligned fully across track 312 at location 322 and therefore transducer gap 316 has been disabled at this location while transducer gap 318 is enabled to pickup information from the track 312. At location 324, transducer gap 316 resides completely within the guardband 310 while transducer gap 318 extends across the full width of the track 312 and therefore, transducer gap 316 continues to be disabled while transducer gap 318 continues to be enabled so as to pickup information from track 312. At location 326, transducer gap 316 has entered significantly upon track 314 to become effectively aligned thereover, while transducer gap 318 is starting to depart from track 312. Therefore, at this location, transducer gap 316 has again become enabled and picks up information from track 314 while transducer gap 318 has been disabled. At location 328, transducer gap 316 continues to reside within track 314 just before starting to depart from that track, while transducer gap 318 has entered into track 314 to replace transducer gap 316 thereon at a later time.

Various signal criteria may be utilized to establish whether or not the transducer gap 316 is effectively aligned. A control means for alternately enabling the transducer gaps 316 and 318 in accordance with one such criteria is illustrated in FIG. 4. Transducer gap 316 is coupled to a preamplifier 402, and transducer gap 318 is coupled to a preamplifier 406. The output terminals of preamplifiers 402 and 406 are alternately coupled to an output terminal 408 of a multiplexer 410 under the control of a multiplex control signal applied to terminal 412 of multiplexer 410. The control signal is derived from the FM carrier that is directed by gap 316 to a parallel arrangement of buffer amplifiers 414 and 416 which drive amplitude (AM) detectors 418 and 420, respectively. Amplitude detector 418 includes a rectifier 422 and a long time-constant filter 424 which averages the received signal over a duration equivalent to the passage of gap 316 over several tracks to produce a substantially constant signal such as that illustrated by dotted line 426. AM detector 420 includes a rectifier 428 and a relatively short time-constant filter 430 which removes radio-frequency variations from the received signal but which allows a response to each track crossing by gap 316. The output signal of filter 430 is illustrated as voltage wavefrom 432 superimposed on waveform 426. A comparator 434 coupled to the filters produces multiplex control signal 436 by which multiplexer 410 couples the signal from gap 316 to its output so long as the received signal exceeds its long-term average value, and couples the signal from gap 318 to its output otherwise.

Figure 5:
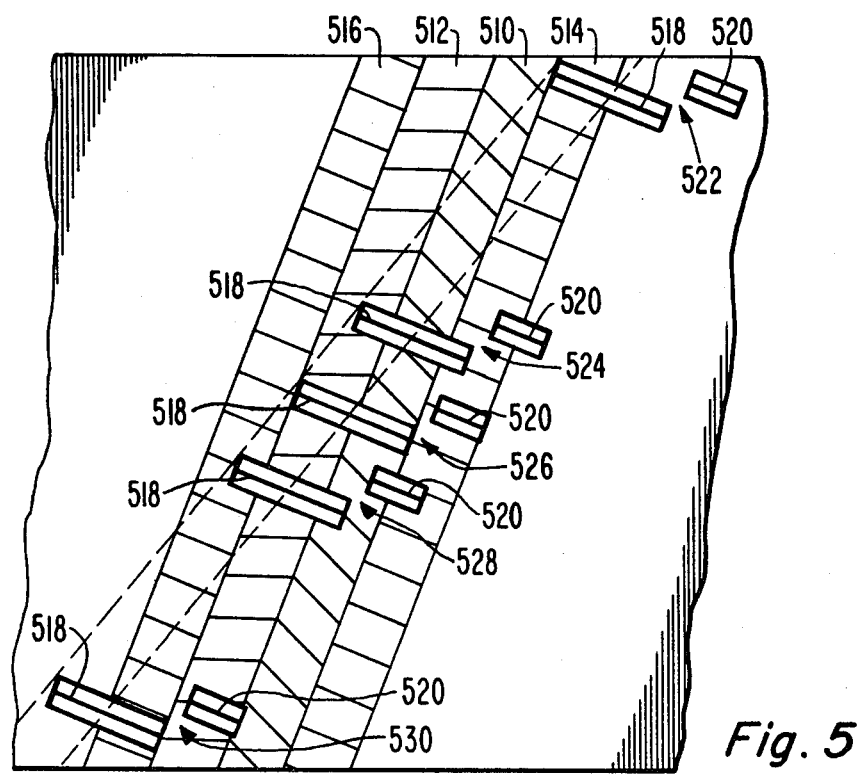

The tap format shown in FIG. 5 includes azimuth angled tracks 510 and 512 which separate tracks 514 and 516 that are to be scanned in sequence by the playback arrangement. The search mode playback arrangement in FIG. 5 includes a first transducer gap 518 that is substantially as wide as the distance between the tracks 514 and 516 to be scanned by the playback arrangement and a second transducer gap 520 that is no wider than the first transducer gap 518. The transducer gap 518 and 520 are disposed in the playback arrangement so as to pass in succession across the width of the tracks to be scanned by the playback arrangement. Furthermore, transducer gaps 518 and 520 are alternately enabled in accordance with which one is picking up the stronger signal from a track to be scanned by the playback arrangement.

As the transducer gaps 518 and 520 are scanned across portions of the tracks during a search mode, they reside in several different positions relative to the tracks 514 and 516 to be scanned by the playback arrangement, as shown in FIG. 5 at locations 522, 524, 526, 528 and 530. At location 522, transducer gap 518 is substantially aligned fully across track 514 and has become enabled because it picks up the stronger signal, while transducer gap 520 has been disabled. At location 524, transducer gap 518 becomes disabled as it departs from track 514 because the signal picked up thereby is relatively weak. However, transducer gap 520 has entered significantly upon track 514 and has become enabled at this location. At location 526, transducer gap 518 lies between the tracks 514 and 516 that are to be scanned by the playback arrangement and across the azimuth angle tracks 510 and 512, while transducer gap 520 lies completely within track 514. Therefore, transducer gap 518 continues to be disabled at this location, while transducer gap 520 continues to be enabled. At location 528, transducer gap 518 has entered upon track 516, but transducer gap 520 picks up the stronger signal from track 514 and therefore, gap 520 continues to be enabled while transducer gap 518 remains disabled. At location 530, transducer gap 518 is fully aligned across track 516, while transducer gap 520 is in the space between tracks 516 and 514. Consequently, transducer gap 518 has been enabled while transducer gap 520 has been disabled.

Various signal criteria may be utilized to establish which transducer gap 518 or 520 is picking up the stronger signal. A control means for alternately enabling the transducer gaps 518 and 520 in accordance with one such criteria is illustrated in FIG. 6. Transducer gaps 518 and 520 are separately coupled to amplitude detectors 612 and 614, respectively. These amplitude detectors may simply be integrators if the signals are digital pulse signals, or if the signals are FM modulated analog video, they may be radio-frequency amplitude detectors. The outputs of the amplitude detectors 612 and 614 are voltages representative of the strengths of the signals transduced by their respective heads. The output signals from amplitude detectors 612 and 614 are separately applied to the input terminals of a voltage comparator 616, which produces a control signal having two states, one of which occurs when the output signal of amplitude detector 612 exceeds that of amplitude detector 614, and the other state occurring when the output signal of amplitude detector 614 exceeds that of detector 612. The control signal produced by comparator 616 is applied to a control input terminal 626 of a multiplexer 622. Each of the transducer gaps 518 and 520 is also separately coupled to an input terminal of the multiplexer 622 which couples one or the other input terminal to an output terminal 624 of the multiplexer 622 under the control of the signal applied to input terminal 626. The signal selected by multiplexers 622 is coupled to a utilization means such as an FM demodulator 628 or other means for using the video signals.

Thus, the stronger of the signals transduced from the recorded tracks by the gaps 518 and 520 of the playback arrangement will be supplied for use during a search mode. The physically offset gaps respond alternately to the recorded track, with the weak-signal pickup condition of one gap occurring when the other gap has substantial response to a recorded track. This reduces the noise banding and weak signal effects of the prior art and provides a more acceptable picture during a search mode. The gaps should be proximate to each other in the playback arrangement so that information relating to substantially the same video frame is transduced by each gap, otherwise different portions of the picture will be displayed after each switching by multiplexer 626.

Other embodiments of the invention will be apparent to those skilled in the art. FIGS. 3 and 5 cover two specific illustrative examples, one using a guardband between the tracks to be scanned by the playback arrangement, the other using no guardbands but having differently angled tracks of information between the tracks to be scanned. The concepts shown can be extended to other arrangements of angles and guardbands.

What we claim is:

1. A search mode playback arrangement for a VTR wherein continuate information is recorded in adjacent tracks disposed angularly across the direction of tape travel, the arrangement comprising:
a pair of transducer gaps, and control means for alternately enabling said gaps in accordance with the amplitude of the reproduced signals from said gaps to continuously pickup coherent information while the playback arrangement scans across adjacent tracks, each said gap being selectively dimensioned and arranged relative to said other gap in accordance with the track format and the signal criteria adopted to alternately enable said gaps.

2. The playback arrangement of claim 1 wherein the first of said transducer gaps is more narrow than the width of the adjacent tracks and the second of said transducer gaps has its width substantially equal to the distance between adjacent tracks plus the width of one such track, the scan of said second transducer gap overlapping the scan of said first transducer gap, said control means enabling said first transducer gap whenever it is effectively aligned over one of the adjacent tracks and enabling said second gap whenever said first gap is not effectively aligned over one of the adjacent tracks.

3. The playback arrangement of claim 1 wherein the first of said transducer gaps is substantially as wide as the distance between adjacent tracks and the second of said transducer gaps is no wider than said first transducer gap, said transducer gaps being relatively disposed to pass separately in succession across the width of the adjacent tracks, said control means enabling each said transducer gap whenever it picks up the stronger signal relative to said other transducer gap.

4. A search mode playback arrangement for a VTR adapted to replay recorded tapes having continuate information disposed on contiguous tracks arranged angularly across the direction of tape motion, said arrangement comprising:
a first search mode playback transducer gap having a width substantially less than the width of the contiguous tracks and being responsive to pickup recorded information when located on those tracks;
a second search mode playback transducer gap being responsive to pickup recorded information when located on the contiguous tracks and having a width substantially greater than the individual width of those tracks, the center of said second transducer gap being offset from the center of said first transducer gap in a direction transverse to the scan direction of said first and second transducer gaps by an amount substantially equal to one-half the sum of the individual width of the contiguous tracks and any space between the contiguous tracks; and
control means for alternately enabling said first and second playback transducer gaps in accordance with the amplitude of the reproduced signals from said gaps with said first gap being enabled whenever it is effectively aligned on one of the contiguous tracks and said second gap being enabled whenever said first gap is not effectively aligned on one of the contiguous tracks so as to continuously pickup coherent information while the playback arrangement scans across the contiguous tracks.

5. A search mode playback arrangement for a VTR adapted to replay recorded tapes having continuate information disposed on contiguous tracks arranged angularly across the direction of tape motion, said arrangement comprising:
a first search mode playback transducer gap having a width substantially equal to the distance between the contiguous tracks and being responsive to pickup recorded information when located on those tracks;

a second search mode playback transducer gap being responsive to pickup recorded information when located on the contiguous tracks, and having a width no greater than said first gap, said first and second gaps being relatively disposed to pass separately in succession across the width of the contiguous tracks; and control means for alternately enabling said first and second gaps in accordance with the amplitude of the reproduced signals from said gaps with each said gap being enabled whenever it picks up the stronger signal relative to said other gap so as to continuously pickup coherent information while the playback arrangement scans across the contiguous tracks.

* * * * *